June 26, 1934.   L. P. DE SORCY   1,964,340
FLUID MOTOR
Filed Aug. 9, 1932   6 Sheets-Sheet 1
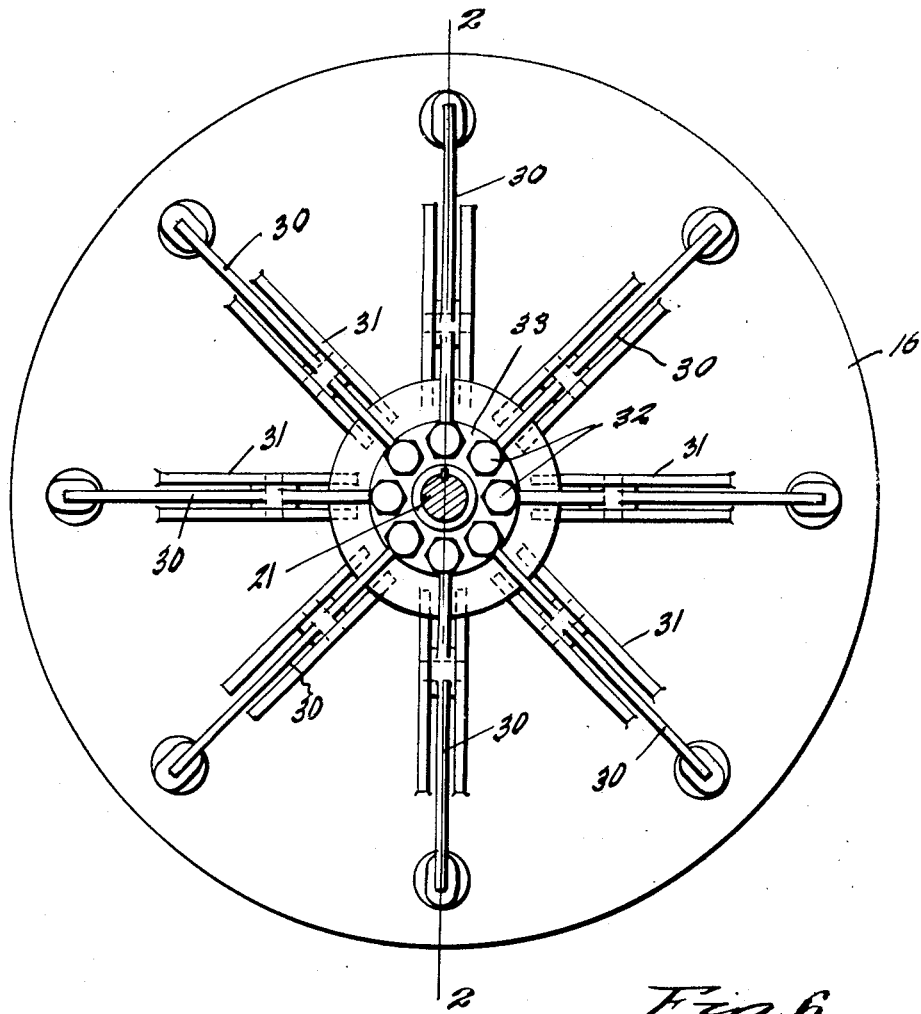
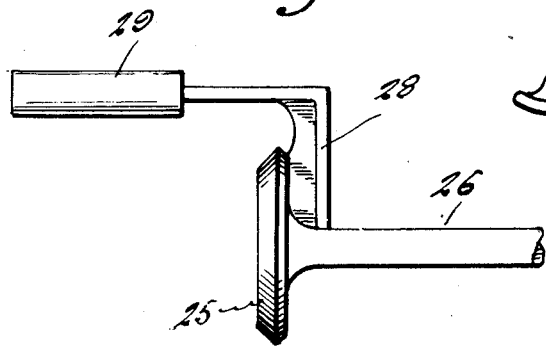
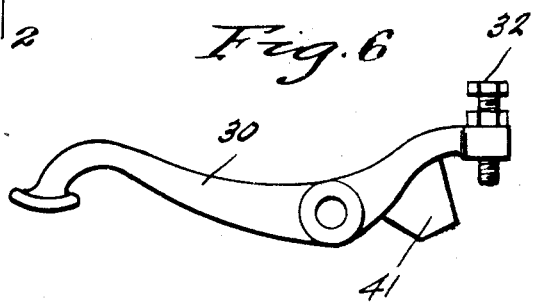
Inventor
Leo P. De Sorcy
By Clarence A. O'Brien
Attorney

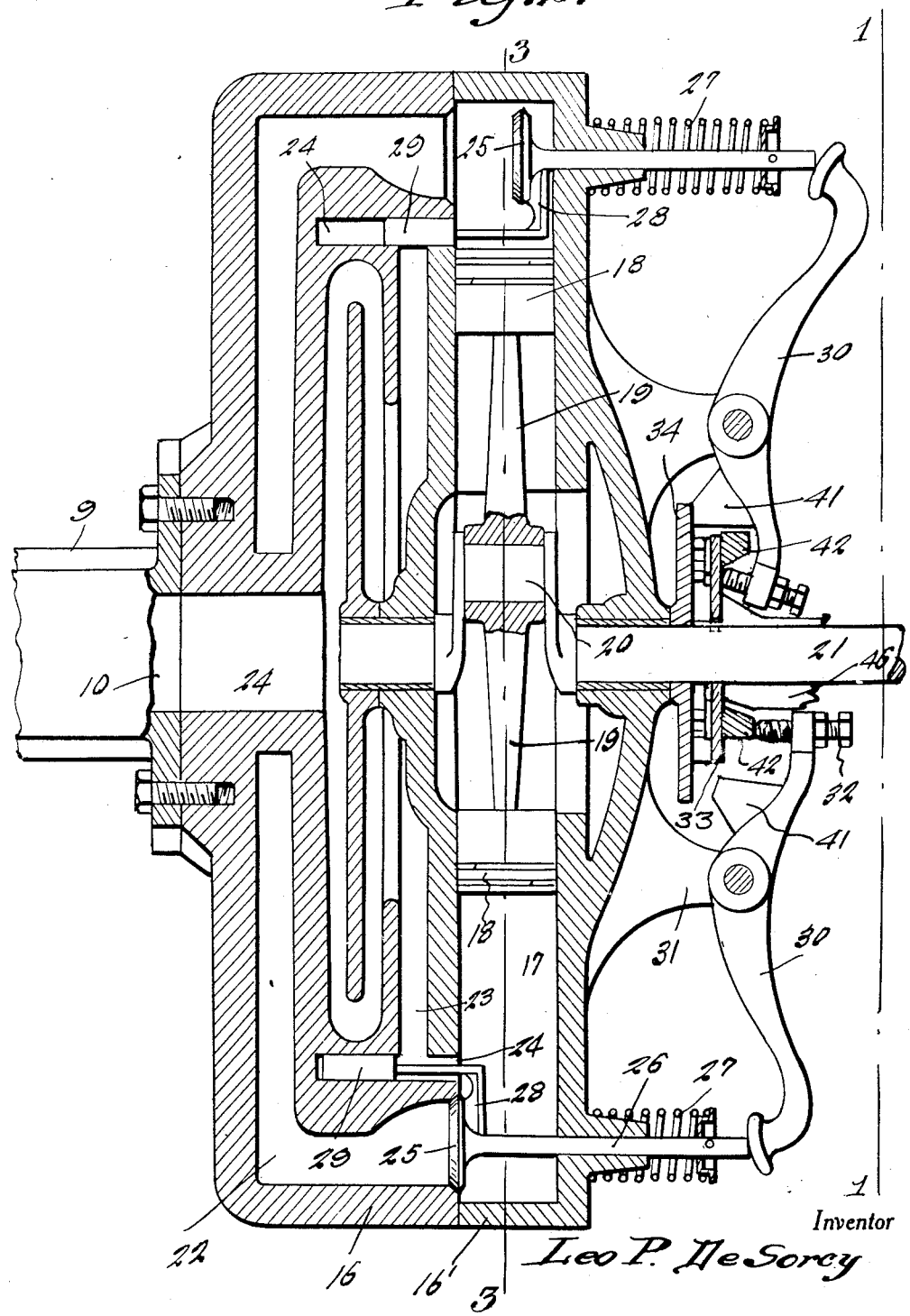

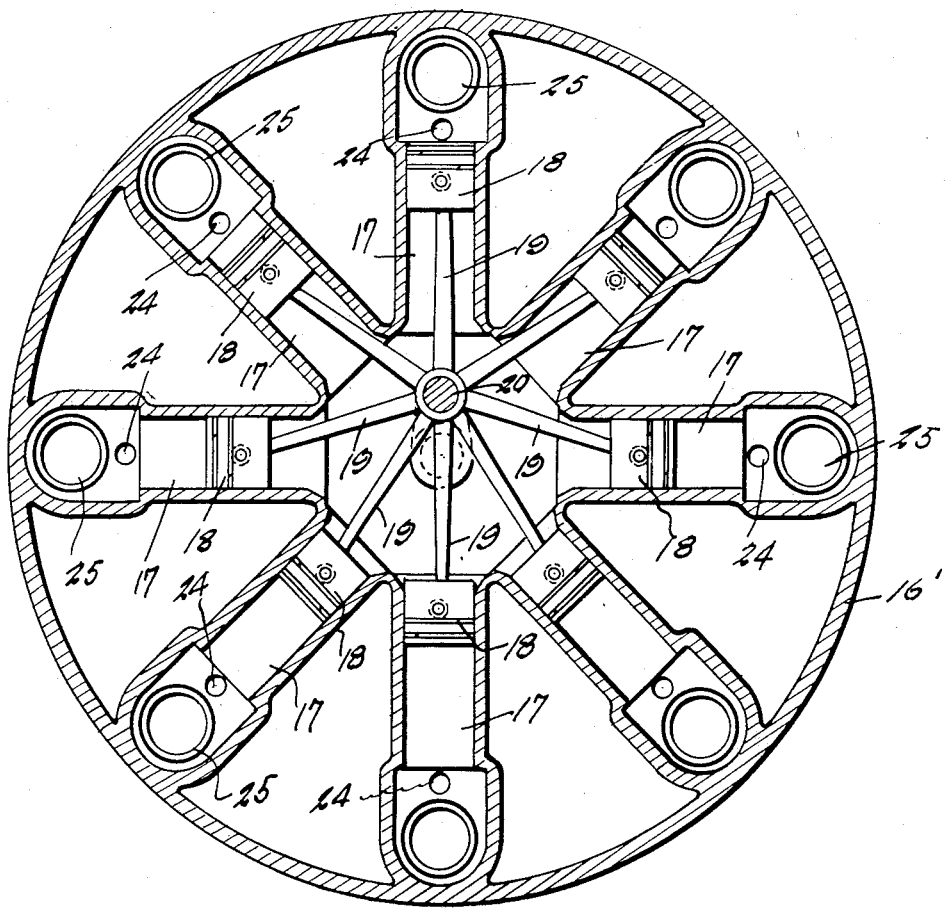
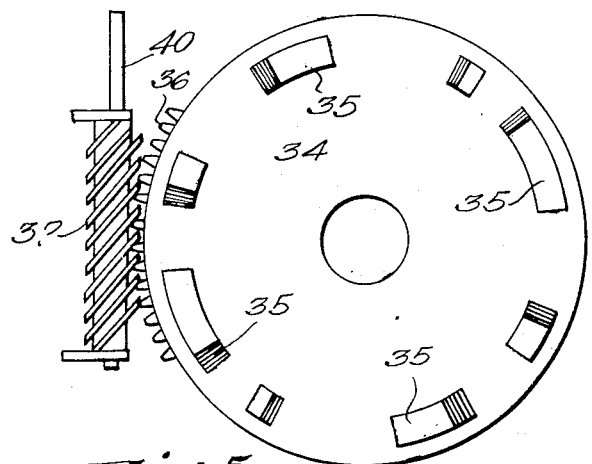
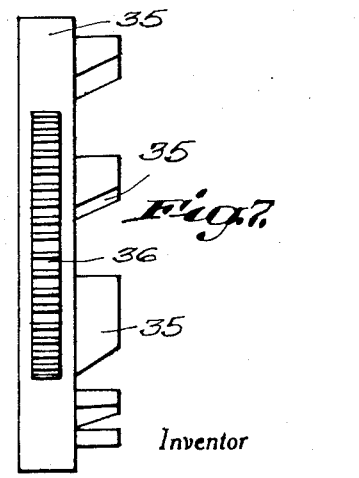

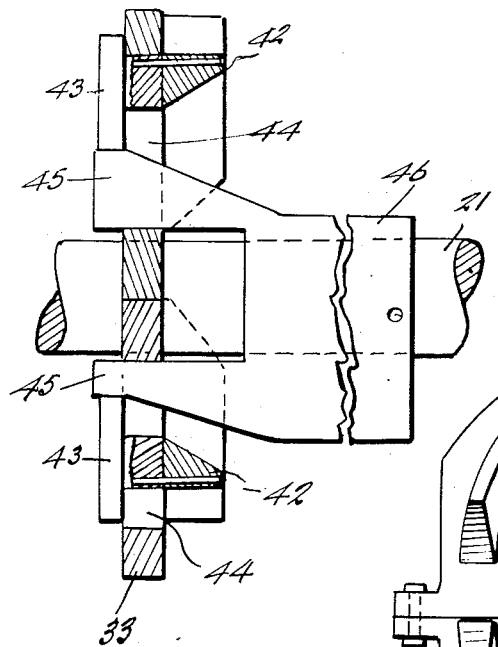
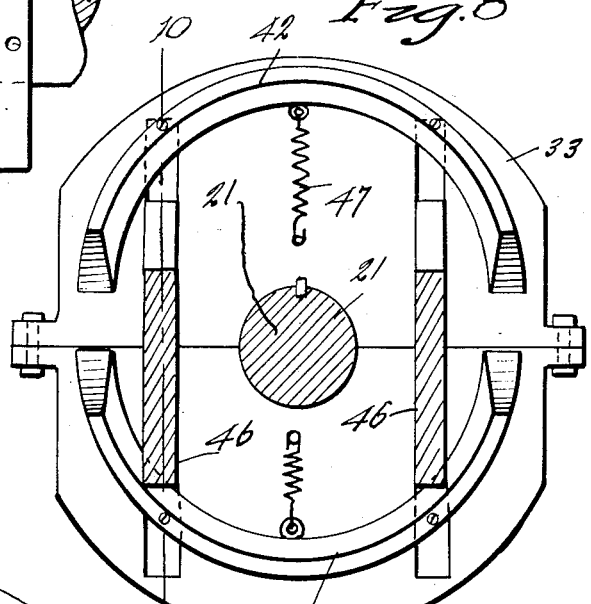
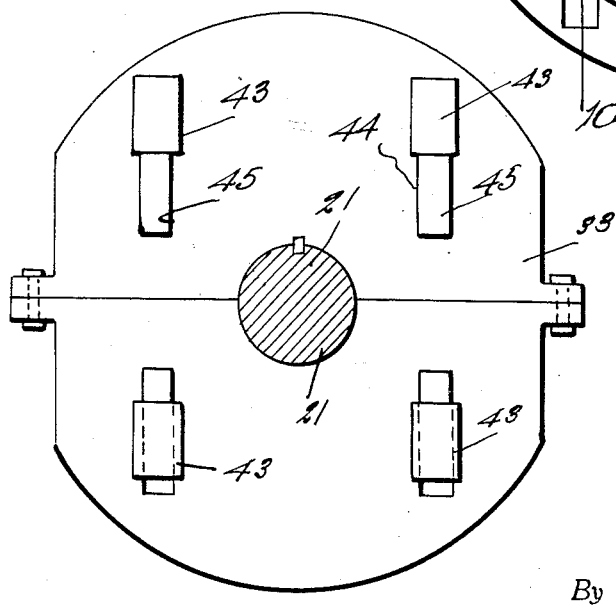

June 26, 1934.  L. P. DE SORCY  1,964,340
FLUID MOTOR
Filed Aug. 9, 1932   6 Sheets-Sheet 5

Inventor
Leo P. DeSorcy

By Clarence A. O'Brien
Attorney

June 26, 1934.    L. P. DE SORCY    1,964,340
FLUID MOTOR
Filed Aug. 9, 1932    6 Sheets-Sheet 6
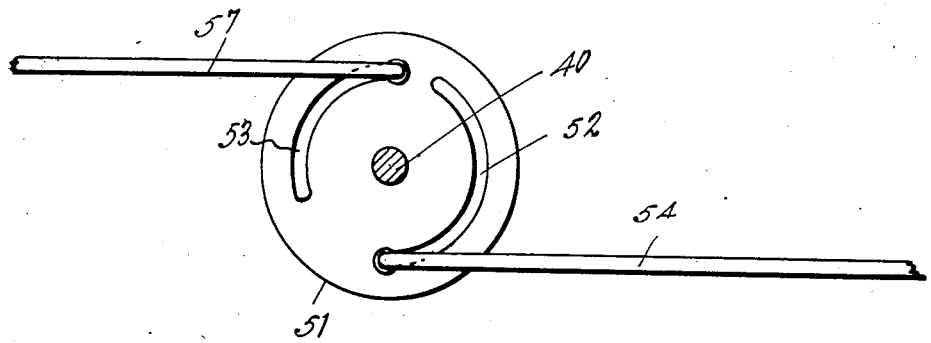
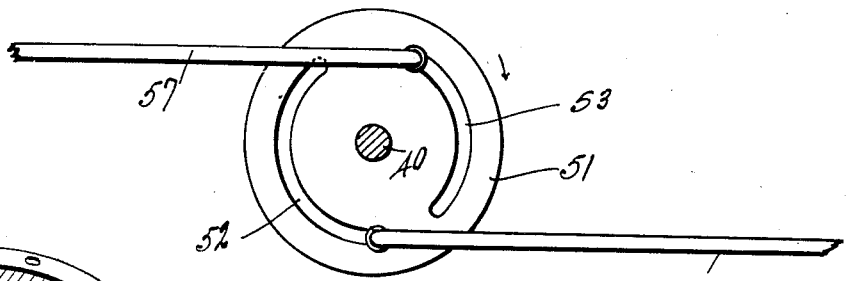
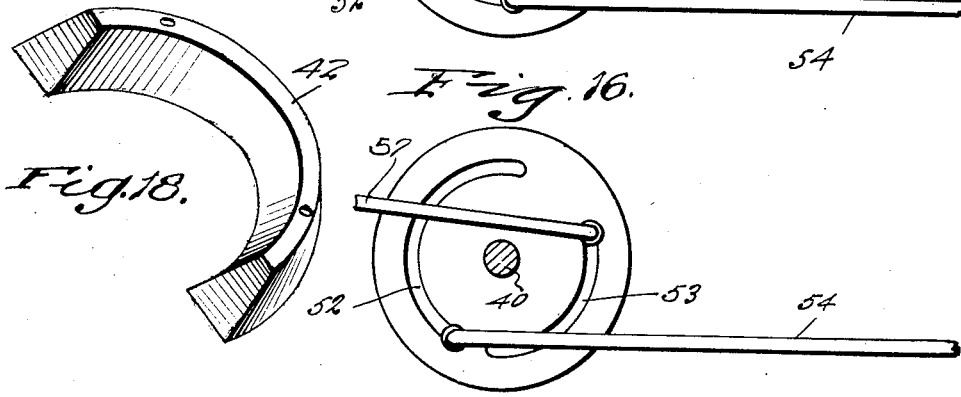
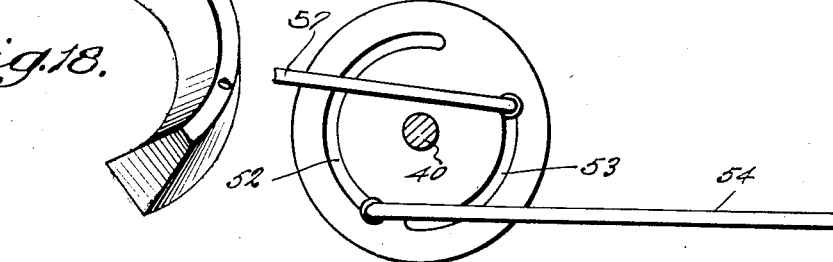
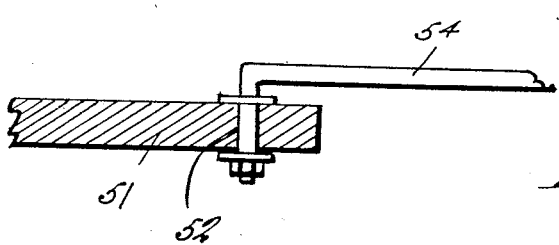
Inventor
Leo P. DeSorcy
By Clarence A. O'Brien
Attorney Patented June 26, 1934

1,964,340

UNITED STATES PATENT OFFICE 1,964,340

FLUID MOTOR

Leo Paul De Sorcy, Vineyard Haven, Mass.

Application August 9, 1932, Serial No. 628,109

4 Claims. (Cl. 121—120)

This invention relates to a hydraulic transmission, the general object of the invention being to provide a pump for pumping oil or the like to a plurality of cylinders containing pistons which are connected to the driven shaft, with means for controlling the flow of oil to the cylinders whereby the driven shaft can be driven at different speeds in either a forward or reverse direction.

This invention also consists in certain other features of construction and in the combination and arrangement of the several parts to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Fig. 1 is a rear view of the cylinder casing, with the driven shaft in section, the section being taken on line 1—1 of Fig. 2.

Fig. 2 is a section on line 2—2 of Fig. 1.

Fig. 3 is a section on line 3—3 of Fig. 2.

Fig. 4 is a view of one of the double valves.

Fig. 5 is a face view of the cam carrying member showing the means for operating the same.

Fig. 6 is a view of one of the rocker arms.

Fig. 7 is an edge view of the cam carrying member.

Fig. 8 is a face view of the main cam member for rocking the rocking arm.

Fig. 9 is a view of the opposite face.

Fig. 10 is a section on line 10—10 of Fig. 8.

Fig. 14 is a section on line 14—14 of Fig. 11, showing the parts in one position.

Fig. 15 is a similar view showing the parts in another position.

Fig. 16 is a similar view showing the parts in still another position.

Fig. 17 is a detail view showing how a rod is connected with the disk.

Figure 18 is a perspective view of one of the semi-circular cams.

Figure 11:
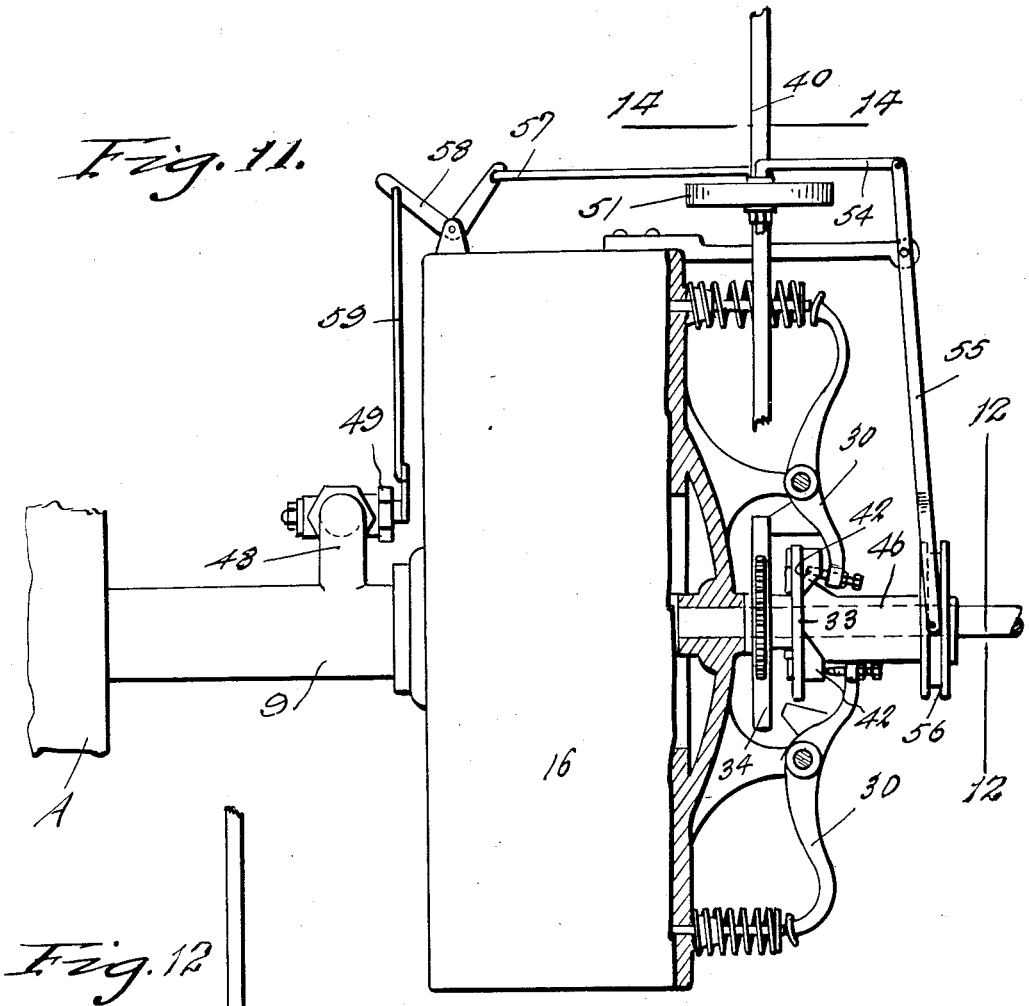
Fig. 11 is a view partly in elevation and partly in section showing the control means.
Figure 12:
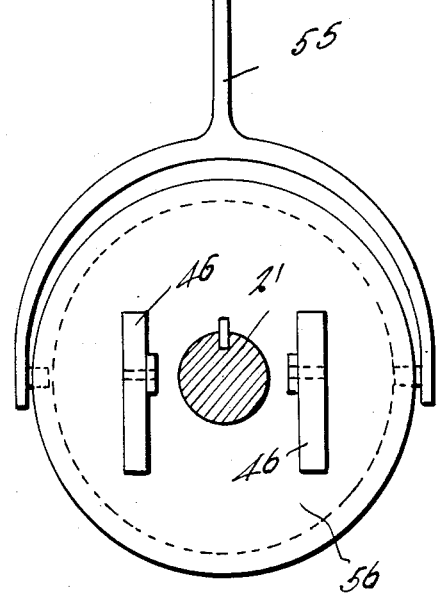
Fig. 12 is a section on line 12—12 of Fig. 11.

In these drawings, the letter A indicates a pump of any suitable construction and which is driven in any suitable manner, from the power plant of a motor vehicle. A housing 16 is connected to the rear of the pump, and said housing includes a part 16' which is formed with a plurality of radial cylinders 17 each of which contains a piston 18 and the connecting rods 19 of the pistons are connected to the crank 20 of the driven shaft 21 which is journalled in one end of the central part of the housing. Passages 22 formed in the housing connect the outlets 9 of the pump with the outer end of the cylinders 17 and tortuous passages 23 lead from ports 24, in communication with the cylinders 17, to the central passage 24 of the housing which is in communication with the inlet passage 10 of the pump.

The valves 25 control communication between cylinders 17 and the passages 22 and the stem 26 of each valve passes through the housing and is engaged by spring 27 which normally holds the valve 25 off its seat. An angle stem 28 is connected to each of the stems 26 and has a valve 29 attached thereto for controlling each of the ports 24. These valve parts are so arranged that when the valve 25 is in closed position, the valve 29 is in open position and when the valve 25 is in open position, the valve 29 is in a position closing a port 24.

Rocker arms 30 pivoted to the projections 31 on the housing have their outer ends engaging the outer ends of the valve stems 26 and the inner ends of the rocker arms carry the adjusting screws 32 engaging cams on a member 33 attached to the shaft 21 for rocking the arms 30 and securing rotary movement of the shaft 21.

If desired, anti-friction means can be placed on the inner ends of the screws 32. A second cam carrying member 34 is rotatably arranged on the shaft 21 and carries on one face the cams 35 which are of varying length and this cam member 34 has teeth 36 on a portion of its periphery which are engaged by the worm 37 on a shaft 40. Each rocker arm carries a projection 41 on its inner part for engaging the cams 35 and, as will be seen, when a rocker arm has its projection 41 engaging a cam 35, the rocker arm will be held in position with the corresponding valve 25, closed with the companion valve 29 open and as the cams 35 are of the shape shown in Fig. 5, by adjusting the member 34, different ones of certain of the valves 25 can be held closed in accordance with the speed at which the shaft 21 is to be driven.

As will be seen, the member 34 is adjusted by turning the shaft 40 and as said member 34 is partly rotated, some of the cams 35 will engage the projections 41 on some of the rocker arms and thus move such arms to position to close the valves 25 and open the valves 29 of the stems which are pressed inwardly by such rocker arms. These rocker arms will remain in this position until the member 34 is again adjusted by manual turning of the shaft 40.

It will of course be understood that the member 33 tends to rock all the rocker arms, but when the projections 41 of the rocker arms are in engagement with the cams 35 of the member 34, such rocker arms will not be affected by the movement of the member 33 as such rocker arms are held by the cams 35 with their screws above the cams of member 33.

Thus it will be seen that with all the rocker arms free of the cams 35, the valves 25 and 29 are opened and closed in a manner to permit the pump to supply fluid to all of the cylinders 17 and when this occurs, the shaft 21 will be driven at low speed with the maximum amount of pressure from the pump. It will of course be understood that the valve 25 is opened and, the valve 29 closed, when the piston 18 is at the outward limit of its movement as shown at the top of Fig. 2 so that the pressure of the fluid from the pump will force the piston inwardly. Then the valve 25 closes and valve 29 opens, so that the outward movement of the piston will force the fluid from the cylinder 17 through the port 24 into the passages 23, and the fluid will flow through the passages into the passage 24 and into the inlet 10, and thus the fluid will return to the pump.

When it is desired to increase the speed of the shaft 21, the member 34 is rotated partly through means of the worm 37 of the shaft 40 so as to bring some of the cams 35 in engagement with the projections 41 of some of the rocker arms 30 so as to hold the valves 25 of such rocker arms in closed position. Thus, the pistons in the cylinders, the valves of which are held closed, will run free, and thus a greater amount of compressed fluid is supplied to the other cylinders, whereby the shaft 21 will be driven at greater speed and then by again adjusting the member 34 to bring other of the cams 35 into engagement with other of the rocker arms, the valves of the other pistons will be closed and the shaft 21 will be driven at still greater speed.

When the member 34 is first operated from a neutral position, the two longest cams 35 will move under the projections 41 of two oppositely arranged rocker arms 30, thus closing two of the valves 25 and opening the two valves 29 which are attached to said valves 25, which results in increased speed. On the next movement of the member 34, the pair of next longest cams 35 will move under two other oppositely arranged rocker arms 30, thus closing two more of the valves 25 and opening the two valves 29 attached thereto. Then when the member 34 is again operated, the third pair of cams 35 will move under a third pair of oppositely arranged rocker arms and on the next movement of the member 34, the two smallest cams will come under the last pair of rocker arms. The cams 35 must be so located and shaped that they will successively raise the rocker arms in pairs until all the arms are raised, the last pair being raised by the smallest pair of cams and when these small pairs of cams are in operative position, all the other cams will be in position holding the rocker arms with which they engage in raised position. When this occurs, all of the valves 25 will be closed and all of the valves 29 will be opened and then the transmission will be in neutral position. Upon further movement of the member 34, the pairs of cams will move from under the rocker arms so that the rocker arms are successively released by the cams 35 in pairs. These cams 35 are provided with beveled ends, as shown in Figures 5 and 7.

In order to provide means for reversing the direction of rotation of the shaft 21, I provide the member 33 with a pair of substantially semi-circular cam members 42, each of which is formed with a beveled inner face and beveled ends, as shown, and these cam members are attached to the slides 43 passing through slots 44 in the member 33, as shown in Figs. 9 and 10, and these slides are actuated by the cam parts 45 on the members 46 which are slidably arranged on the shaft 21. As shown in Figs. 8, 9 and 10, the cam parts 45 are so formed that one of the cams 42 is moved outwardly into inoperative position when the other cam member 42 is in operative position. Of course when a cam 42 is in inoperative position it will not engage the screws 32 of the rocker arms.

The cams 42 are normally held in operative position by the springs 47 so that as the small cam parts 45 engage the slides 44 of a cam 42, the spring 47 will move the cam to operative position, but when the large cam parts 45 engage the slides of a cam 42, said cam is moved out of operative position.

As a cam 42 is moved inwardly by its spring 47, all the screws 32 contacted by the cam will ride up the cam and engage its outer edge or top edge and each cam is of such a length as to engage a number of the screws 32 of the rocker arms at the same time.

Thus when the shaft 21 is driven in one direction and it is desired to drive it in an opposite direction, it is simply necessary to move the members 46 to a position to move the cam 42, which has been engaging the rocker arms to inoperative position and the other cam 42 to operative position, whereby the fluid will be delivered to the cylinders 17 in such a manner as to cause the reverse operation of the shaft 21 and by adjusting the member 34 the shaft 21 can be driven at different speeds when either rotating forwardly or reversely.

Figure 13:
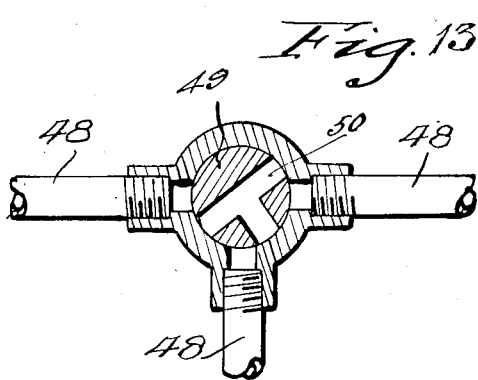
Fig. 13 is a sectional view thru the by-pass valve.

As it is necessary to stop the rotation of the shaft 21 as it is being driven in one direction and it is desired to drive it in an opposite direction I provide means for stopping the flow of the fluid from the pump to the cylinders 17 and such means includes the by-pass 48 in communication with the outlets 9 of the pump and with the inlet 10, as shown in Figures 11 and 13, and the valve 49 for controlling the passage of fluid through the by-pass as shown in Fig. 13.

This by-pass and valve arrangement is such that when the valve is in a certain position, its T-shaped port 50 will connect the two outlets 9 to the inlet 10 so that the fluid from the pump will flow back into the pump and not enter the cylinders 17, but in other positions of the valve, the by-pass is closed.

I prefer to operate the reversing means and the valve 49 from the shaft 40 which controls the movement of the member 34 and the drawings show means whereby this can be done. The shaft 40 has its worm 37 provided with a quick thread so that a substantial half turn of the shaft will move the member 34 to the different positions necessary to regulate the positions of the valves 25 and 29. This shaft has a disk 51 attached thereto which is formed with arcuate slots 52 and 53 the slot 52 being engaged by the bent end of a rod 54 which is connected to the upper end of the lever 55, the forked lower end of which engages the groove in a collar 56 to which the parts 46 are attached.

A rod 57 has its bent end engaging the slot 53 and the other end of this 57 is connected to a bell crank 58 which is connected by a link 59 with an arm 60 of the valve 49. These parts are so arranged, as shown in Figs. 14, 15 and 16, that the shaft 40 can be partly rotated to adjust the member 34 to the position necessary to regulate the speed of the device or rather of the shaft 21 without moving the rods 54 and 57. However, when it is desired to reverse the rotary movement of the shaft 21, the shaft 40 is turned far enough to first move the member 34 to a position where all of its cams 35 will be out of engagement with the projections on the rocker arms, and then the valve 49 will be moved to open position to by-pass the pump outlets with its inlet and then the members 46 are shifted to move the cams 42 on the member 33 to a position to cause a reversal of the shaft 21.

As shown in Fig. 16, when the members 46 have been shifted to reverse the position of the cams 42 of the member 33, the valve 49 will have been moved to a closed position, so that the pump will again force fluid into the cylinders 17 to rotate the shaft 21 in a reverse direction. With the parts in position for driving the shaft 21 in reverse direction the shaft 40 can still be moved to adjust the member 34 to control the speed of the shaft 21 while being driven in a reverse direction.

While the invention is shown in use on a motor vehicle, it will of course be understood that it can be used for driving other machines.

This transmission can be used on a motor vehicle or the like and will permit shifting from first to high, and high to first at any speed without working the clutch and will create an indirect power which will assure greater riding comfort. It will also prevent the engine from bucking when shifting to high at low speed.

It is thought from the foregoing description that the advantages and novel features of the invention will be readily apparent.

It is to be understood that changes may be made in the construction and in the combination and arrangement of the several parts, provided that such changes fall within the scope of the appended claims.

Having thus described my invention, what I claim as new is:—

1. In a device of the class described a plurality of radiating cylinders, a piston in each cylinder, a driven shaft having a crank to which the pistons are connected, inlet valves for controlling the flow of fluid into the cylinders, an outlet valve connected to each inlet valve controlling the flow of fluid from the cylinder, means for actuating the valves from the driven shaft, means for holding certain of the inlet valves closed and the corresponding outlet valves opened, to regulate the speed of the driven shaft, means associated with the operating means for the valves for changing the operation of the valves for reversing the driven shaft; means for stopping the flow of fluid to the cylinders when the direction of rotation of the driven shaft is to be changed and a manually operated member for actuating the said three means.

2. An apparatus of the class described comprising, a plurality of radial cylinders, each cylinder having an inlet port and an outlet port, a valve controlling each port, each outlet valve being connected to an inlet valve, said inlet valve being closed while the outlet valve is opened, a driven member having a crank thereon, pistons connected with the crank and located in the radial cylinders, a stem for each inlet valve, rocker arms engaging said stems for closing the inlet valves and opening the outlet valves, a cam member connected with the driven member for operating the rocker arms, a projection on the inner end of each rocker arm, a manually adjustable cam carrying member, the cams of which are adapted to engage the projections for holding the rocker arms with the inlet valves in closed position, said cams being of different size, adjustable cam parts on the first-mentioned cam member, means for adjusting said cam parts to operative and inoperative position for changing the operation of the valves by the rocker arms for reversing the movement of the driven member.

3. In a device of the class described, a supporting member, a plurality of radiating cylinders supported thereby, a piston in each cylinder, a driven shaft having a crank to which the pistons are connected, each cylinder having an inlet port and an outlet port adjacent its outer end, an inlet valve for each port having a stem, an outlet valve for each exhaust port having its stem connected to the companion inlet valve, said exhaust valve being in open position when the inlet valve is in closed position, a plurality of rocker arms pivotally supported by the supporting member for engaging the stems of the inlet valves, a cam carrying member attached to the driven shaft, the cams of which engage the rocker arms for operating the same, means for adjusting the cams on said member for changing the operation of the valves for reversing the driven shaft, a second cam carrying member rotatably arranged on the shaft, projections on the inner portions of the rocker arms for engaging the cams of said second member and means for adjusting said second member to hold certain of the inlet valves closed and the outlet valves opened, to regulate the speed of the driven shaft.

4. In an apparatus of the class described, a plurality of radiating cylinders, a piston in each cylinder, a driven shaft having a crank to which the pistons are connected, inlet valves for controlling the flow of fluid into the cylinders, an outlet valve connected to each inlet valve for controlling the flow of fluid from each cylinder, a stem connected with each inlet valve, a plurality of rocker arms engaging the stems, spring means for normally holding the inlet valves open and the outlet valves closed, a cam carrying member attached to the shaft, the cams of which operate the rocker arms, a second cam carrying member rotatably arranged on the shaft and having cams thereon of different sizes, a projection on the inner part of each rocker arm adapted to engage a cam on the second cam carrying member and manually operated means for adjusting said second member to cause desired cams thereon to engage certain projections for holding certain of the inlet valves closed and the corresponding outlet valves open.

LEO PAUL DE SORCY.